United States Patent
Itami

(10) Patent No.: US 9,643,455 B2
(45) Date of Patent: May 9, 2017

(54) PNEUMATIC RADIAL TIRE FOR AIRCRAFT

(75) Inventor: Daisuke Itami, Kodaira (JP)

(73) Assignee: BRIDGESTONE CORPORATION, Chuo-Ku, Tokyo (JP)

( * ) Notice: Subject to any disclaimer, the term of this patent is extended or adjusted under 35 U.S.C. 154(b) by 1043 days.

(21) Appl. No.: 13/819,158

(22) PCT Filed: Aug. 25, 2011

(86) PCT No.: PCT/JP2011/004724
§ 371 (c)(1),
(2), (4) Date: Apr. 29, 2013

(87) PCT Pub. No.: WO2012/026123
PCT Pub. Date: Mar. 1, 2012

(65) Prior Publication Data
US 2013/0206307 A1    Aug. 15, 2013

(30) Foreign Application Priority Data

Aug. 27, 2010  (JP) ................................. 2010-191421

(51) Int. Cl.
  *B60C 9/20*    (2006.01)
  *B60C 9/00*    (2006.01)
  *B60C 9/18*    (2006.01)

(52) U.S. Cl.
  CPC .................. *B60C 9/00* (2013.01); *B60C 9/18* (2013.01); *B60C 9/20* (2013.01);
  (Continued)

(58) Field of Classification Search
  CPC  B60C 9/0057; B60C 9/18; B60C 9/20; B60C 9/00; B60C 2009/2032;
  (Continued)

(56) References Cited

U.S. PATENT DOCUMENTS 3,757,843 A * 9/1973 Carr ...................... B60C 9/2009
                                                         152/527
4,418,735 A * 12/1983 Musy ..................... B29D 30/00
                                                         152/198
(Continued)

FOREIGN PATENT DOCUMENTS

JP         1-215602 A     8/1989
JP         3-21505 A      1/1991
(Continued)

OTHER PUBLICATIONS

Extended European Search Report, dated Jul. 11, 2014, issued in European Patent Application No. 11819599.9.
(Continued)

*Primary Examiner* — Michael H Wilson
*Assistant Examiner* — Philip N Schwartz
(74) *Attorney, Agent, or Firm* — Sughrue Mion, PLLC

(57) ABSTRACT

Provided is a pneumatic radial tire for aircraft that includes a radial carcass constituting a backbone structure of the tire, a belt (6) disposed along an outer periphery of a crown region of the radial carcass, and at least one protective layer (7) disposed along an outer periphery of the belt (6) and formed by a plurality of cords (9). The cords (9) in the protective layer (7) are curved in a sinusoidal shape and disposed in parallel with equal phase. An acute inclination angle θ between an amplitude center line of each cord (9) relative to a tire circumferential direction, a half amplitude a of each cord (9), and a wavelength λ of each cord (9) satisfy the relationship: $\tan\theta > 2\pi a/\lambda > 0.4$ $(0° < \theta < 90°)$.

2 Claims, 5 Drawing Sheets

(52) U.S. Cl.
   CPC .. *B60C 2009/2032* (2013.04); *B60C 2200/02* (2013.04); *Y10T 152/10765* (2015.01)

(58) Field of Classification Search
   CPC ...... B60C 2009/229; B60C 2009/2012; B60C 2009/2016; B60C 2009/2019; B60C 2009/2022; B60C 2009/2025; B60C 2200/02; B60C 2200/06; B60C 2200/065; Y10T 152/10792; Y10T 152/10801; Y10T 152/10765
   See application file for complete search history.

(56) References Cited

U.S. PATENT DOCUMENTS

| | | |
|---|---|---|
| 2005/0194081 A1 | 9/2005 | Yano et al. |
| 2008/0227307 A1 | 9/2008 | Alden et al. |
| 2008/0277037 A1 | 11/2008 | Yano |

FOREIGN PATENT DOCUMENTS

| | | |
|---|---|---|
| JP | 3-38405 A | 2/1991 |
| JP | 6-32109 A | 2/1994 |
| JP | 2000-158909 A | 6/2000 |
| JP | 2002-187408 A | 7/2002 |
| JP | 2007-45354 A | 2/2007 |
| WO | 03/061991 A1 | 7/2003 |
| WO | 2006/035940 A1 | 4/2006 |

OTHER PUBLICATIONS

Communication dated Dec. 1, 2014 from the State Intellectual Property Office of P.R. China in counterpart application No. 201180049768.2.

International Search Report for PCT/JP2011/004724 dated Nov. 29, 2011.

Communication dated Apr. 28, 2015 from the Japanese Patent Office in corresponding application No. 2012-530539.

* cited by examiner

PNEUMATIC RADIAL TIRE FOR AIRCRAFT

TECHNICAL FIELD

The present invention relates to radial tires for aircraft, and in particular to an improvement in pneumatic radial tires for aircraft that reduces the volume of any tread rubber fragment that detaches.

BACKGROUND ART

When a pneumatic radial tire for aircraft rolls over a foreign object that has fallen onto the runway, a cut may occur in the tread. If the cut reaches the belt or the carcass, the tire may puncture, or the tread rubber may detach from the tire starting at the cut.

To address this problem, a technique is proposed in Patent Literature 1, for example, to provide a crown protective layer between the belt layer and the tread. The crown protective layer is formed from a wavy cord layer composed of wavy cords arranged in parallel and an organic fiber cord layer located further outward in the tire radial direction than the wavy cord layer, composed of organic fiber cords arranged in parallel, and extending in a straight line either in the circumferential direction of the tread or at an angle with respect to the circumferential direction of the tread. When damage to the tread is received, the wavy cord layer inhibits the damage from reaching through to the belt layer, and after damage to the tread, the organic fiber cord layer inhibits cracks from spreading in the circumferential direction along the bottom of tread grooves.

FIG. 5 is a partial developed plan view schematically showing the belt structure of the above-described tire. As shown in FIG. 5, the amplitude center line of one of the wavy cords, indicated by the alternate long and short dash line, is substantially parallel to the equatorial surface of the tire. Therefore, if rubber becomes detached at the interface between these cords and the rubber layer located on the outer periphery thereof, the detachment extends along the cords in the circumferential direction of the tire, thus increasing the size of the detached rubber fragment and running the risk of the fragment damaging the body of the aircraft, for example by colliding against the aircraft.

CITATION LIST

Patent Literature

PTL 1: JP1215602A

SUMMARY OF INVENTION

Technical Problem

To address the above problems, it is an object of the present invention to provide a pneumatic radial tire for aircraft that reduces harm to the body of the aircraft or other damage produced even if rubber, such as tread rubber, detaches.

Solution to Problem

A pneumatic radial tire for aircraft according to the present invention comprises a radial carcass constituting a backbone structure of the tire, a belt disposed along an outer periphery of a crown region of the radial carcass, and at least one protective layer disposed along an outer periphery of the belt and formed by a plurality of cords, wherein the cords in the protective layer are curved in a sinusoidal shape and disposed in parallel with equal phase, and an acute inclination angle $\theta$ of an amplitude center line of each cord relative to a tire circumferential direction, a half amplitude a of each cord, and a wavelength $\lambda$ of each cord satisfy the relationship: $\tan \theta > 2\pi a/\lambda > 0.4$ ($0° < \theta < 90°$).

The belt and the cords forming the protective layer may be either steel cords or organic fiber cords. Organic fiber monofilaments may also be used.

In this pneumatic radial tire for aircraft, the inclination angle $\theta$ preferably satisfies the relationship: $40° < \theta < 80°$.

Advantageous Effect of Invention

Since the pneumatic radial tire for aircraft of the present invention comprises a protective layer in which a plurality of cords are curved in a sinusoidal shape and disposed in parallel with equal phase, the waveform of the cords can change shape in accordance with changes in form to the tire when, for example, the tire is mounted onto the rim and inflated to a specified internal pressure. Therefore, no tension is exerted on the cords themselves, thereby preventing the cords from cutting into the tread rubber or the protective layer cords and the tread rubber from becoming detached.

Furthermore, having the acute inclination angle $\theta$ of the amplitude center line of each cord in the protective layer relative to the circumferential direction of the tire, the half amplitude a of each cord, and the wavelength $\lambda$ of each cord satisfy the relationship $\tan \theta > 2\pi a/\lambda > 0.4$ ($0° < \theta < 90°$) inclines the amplitude center of each cord, and therefore the entire cords themselves, so that even if tread rubber detaches, the force detaching the rubber in the tire circumferential direction is dissipated in the tire width direction as well. Additionally, a torsional force is applied to the detached rubber in the tire circumferential direction and the tire width direction, thus making it easier for the rubber to separate and reducing the size of tread rubber fragments that break away.

In greater detail, when the above relationship $\tan \theta > 2\pi a/\lambda$ is satisfied, the material for the protective layer can be formed at the time of tire manufacturing without the need to segment, during a cutting step, any of the plurality of wavy cords embedded within the protective layer. Hence, the amplitude and wavelength of the wavy cords in the protective layer can change in accordance with changes in form to the tire when, for example, the tire is mounted onto the rim and inflated to the internal pressure. Note that when the relationship $\tan \theta > 2\pi a/\lambda$ is not satisfied, the wavy cords may become segmented during formation of the protective layer material, thereby preventing the wavy cords in the protective layer from changing in accordance with changes in form to the tire.

When the angle $\theta$ is 0°, then if rubber, such as tread rubber, detaches from the cords in the protective layer, the cords act as a guide, facilitating the spread of rubber detachment in the circumferential direction of the tire. Conversely, if the angle $\theta$ is 90°, the effect of change in the cord waveform cannot be obtained.

If $2\pi a/\lambda$ is equal to or less than 0.4, the effect of the wavy cords changing in accordance with changes in form to the tire becomes insufficient, thus producing tension on the cords themselves and running the risk of the cords cutting into the tread rubber or of the protective layer and the tread rubber detaching.

BRIEF DESCRIPTION OF DRAWINGS

The present invention will be further described below with reference to the accompanying drawings, wherein.

DESCRIPTION OF EMBODIMENTS

The following describes the pneumatic radial tire for aircraft of the present invention in detail with reference to the drawings.

Figure 1:
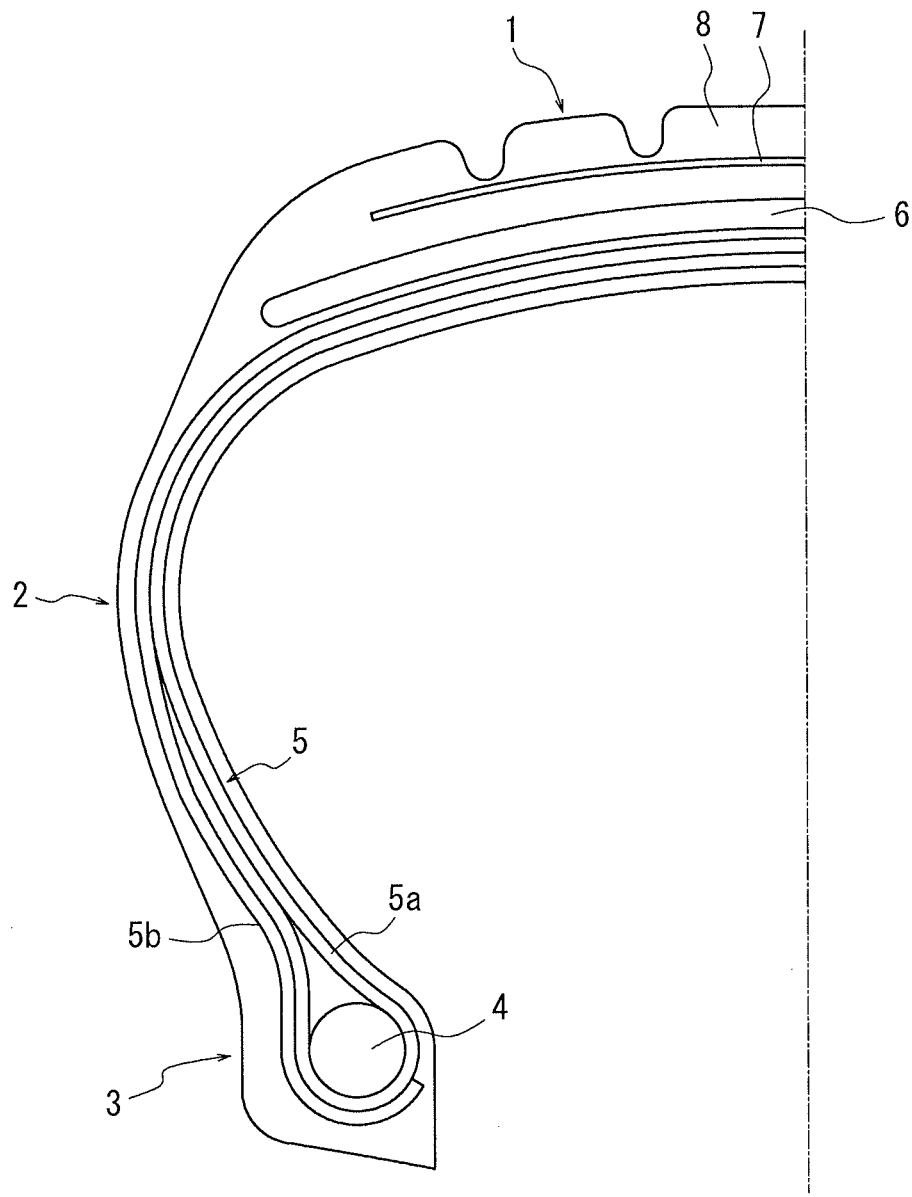
FIG. 1 is a cross-sectional view of an embodiment of a pneumatic radial tire for aircraft of the present invention, showing half of the tire along the meridional line.
Figure 2:
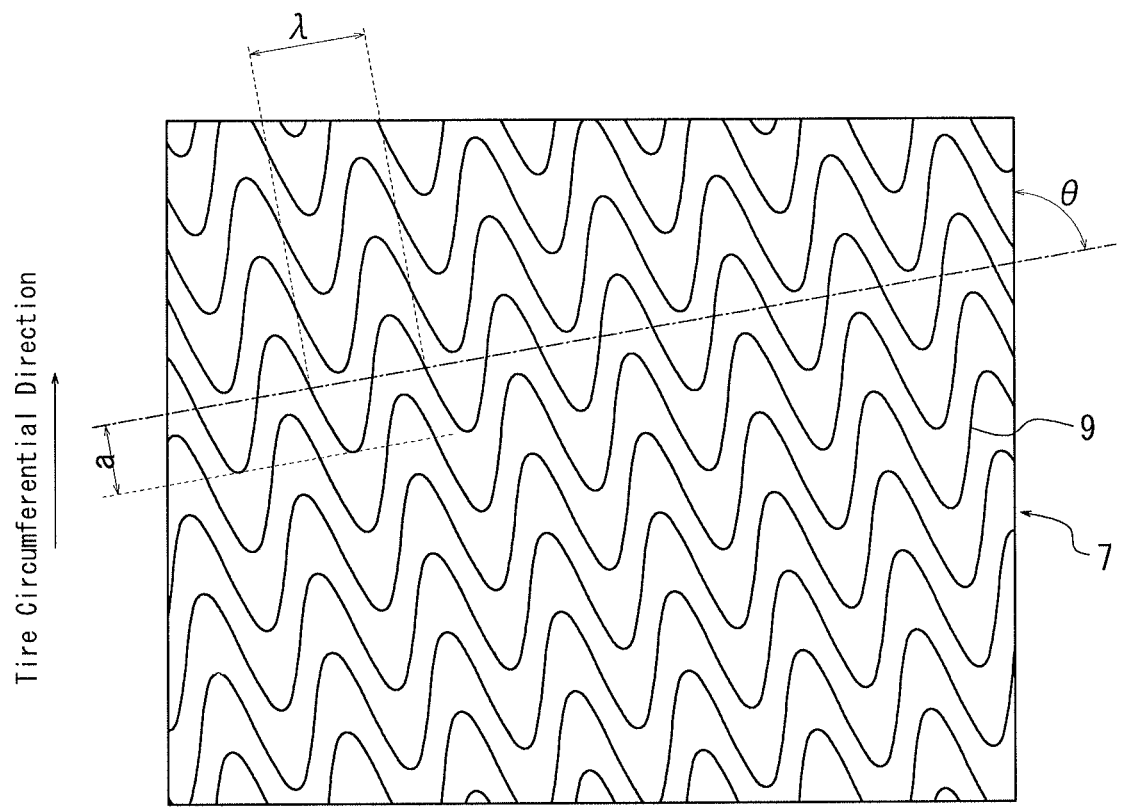
FIG. 2 is a partial developed plan view schematically showing the belt structure of the tire in FIG. 1.

In FIGS. 1 and 2, a tread portion is labeled 1, a pair of sidewalls extending continuously from the side of the tread portion 1 inwards in the radial direction is labeled 2, and a bead portion continuous with the inner circumference of each sidewall 2 is labeled 3.

The tire shown here is provided with a bead core 4 embedded in each of the pair of bead portions 3 and a radial carcass formed by carcass plies 5 composed of a plurality of organic fiber cords extending toroidally between the bead cores 4 at an angle in a range from 70° to 90° with respect to the tire equatorial surface.

Along the outer periphery of the crown region of the radial carcass, a plurality of nylon cords, for example, are aligned extending at an angle between 10° and 60°, for example, with respect to the tire equatorial surface. A belt 6 composed of a cord cross belt layer, a protective layer 7 formed by disposing a plurality of cords curved in the shape of a sine wave, and a tread rubber 8 are disposed in this order. One protective layer 7 is show in the drawings. A plurality of circumferential grooves, for example, is formed on the surface of the tread rubber 8 extending in the circumferential direction of the tire.

This radial carcass has a so-called up-down structure in which the carcass plies 5 include turn-up plies 5a that are wound around the lateral portion of each bead core 4 from the inside towards the outside in the direction of tire width and down plies 5b that cover the portion of the turnup plies 5a wound around the bead cores 4 and that extend inward in the radial direction at least to an inner portion of the bead cores 4 in the radial direction.

This up-down structure offsets the tension around the bead cores 4 exerted on the turnup plies 5a and the down plies 5b, thus allowing mutual restraining forces to act in order to effectively prevent the carcass plies 5 from becoming dislodged.

As a result, it is possible to guarantee sufficient pressure resistance, load bearing capabilities, and the like as required for radial tires for aircraft.

In this pneumatic radial tire for aircraft, a plurality of cords 9 curved in a sinusoidal shape are disposed in parallel with equal phase in the protective layer 7. The acute inclination angle $\theta$ of the amplitude center line of each wavy cord 9 relative to the tire circumferential direction, and the half amplitude a and the wavelength $\lambda$ of each wavy cord 9 satisfy the relationship $\tan \theta > 2\pi a/\lambda > 0.4$ ($0° < \theta < 90°$).

In such a tire, the protective layer 7 can absorb and bear stress in the tire radial direction produced by expansion during inflation to the internal pressure, thus reducing deformation and inhibiting the occurrence and growth of damage to the tread portion 1, while also inhibiting damage to the tread portion 1 from spreading in the circumferential direction of the tire. The protective layer 7 therefore increases the durability of the tire by dramatically improving cut resistance and preventing damage from reaching the belt 6 until the tread is nearly worn.

In such a tire, the inclination angle $\theta$ is preferably in the following range: $40° < \theta < 80°$. This range not only improves resistance to detachment of rubber, such as the tread rubber 8, but also decreases the size of any rubber fragment that does detach.

The half amplitude a and the wavelength $\lambda$ are preferably in the following ranges: 2 mm $<$ a $<$ 20 mm, and 10 mm $< \lambda <$ 50 mm.

In the above-described tire, the material for the protective layer 7 disposed along the outer periphery of the belt 6 may be formed as follows.

Figure 3:
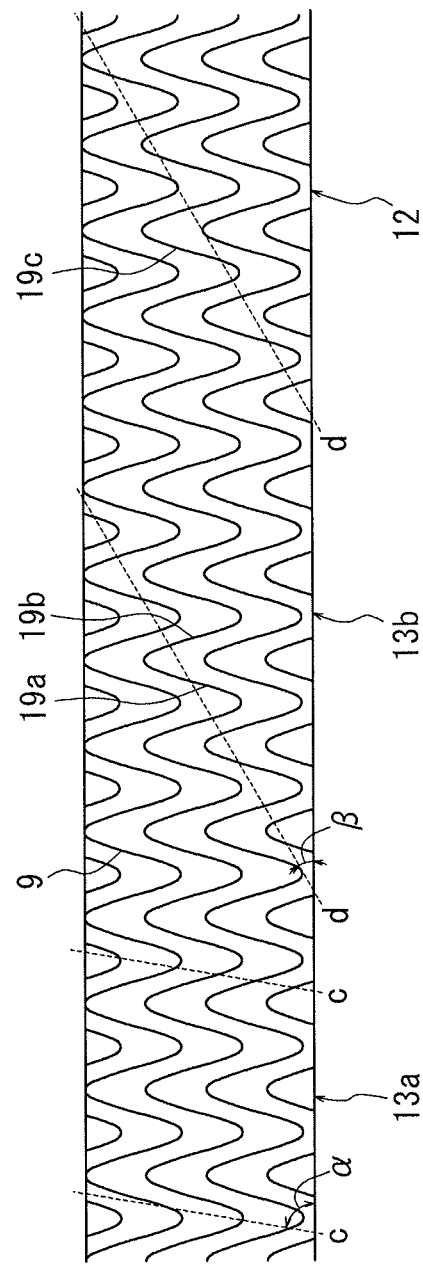
FIG. 3 is a partial plan view of a strip-shaped member schematically showing a cutting step to cut a sheet member with embedded wavy cords during formation of the material for the protective layer of the tire shown in FIG. 1.

First, as shown in FIG. 3, a plurality of wavy cords 9 curved in the sinusoidal shape are disposed in parallel with equal phase, coated with unvulcanized rubber, and formed into an elongated, wide strip-shaped member 12.

Next, from the strip-shaped member 12 having the wavy cords 9 embedded therein, a sheet member 13a is cut out by cutting in the direction of length of the strip-shaped member 12, i.e. in a direction c that is inclined at a predetermined angle $\alpha$ with respect to a straight line traversing the amplitude center of each wavy cord 9.

Figure 4:
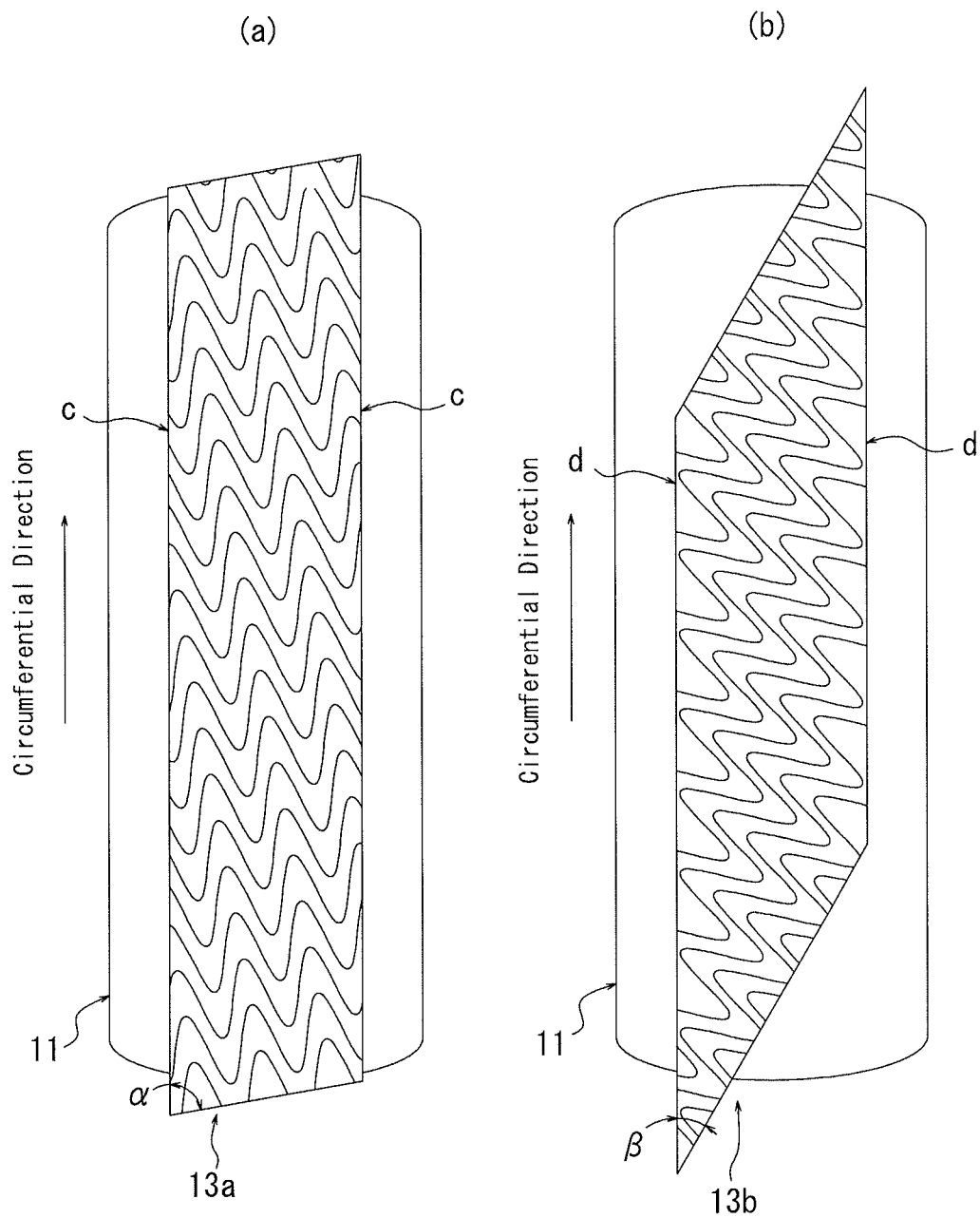
FIG. 4 is a plan view schematically showing steps for disposing the sheet member cut in the step shown in FIG. 3 along the outer periphery of a cylindrical tire structural member.
Figure 5:
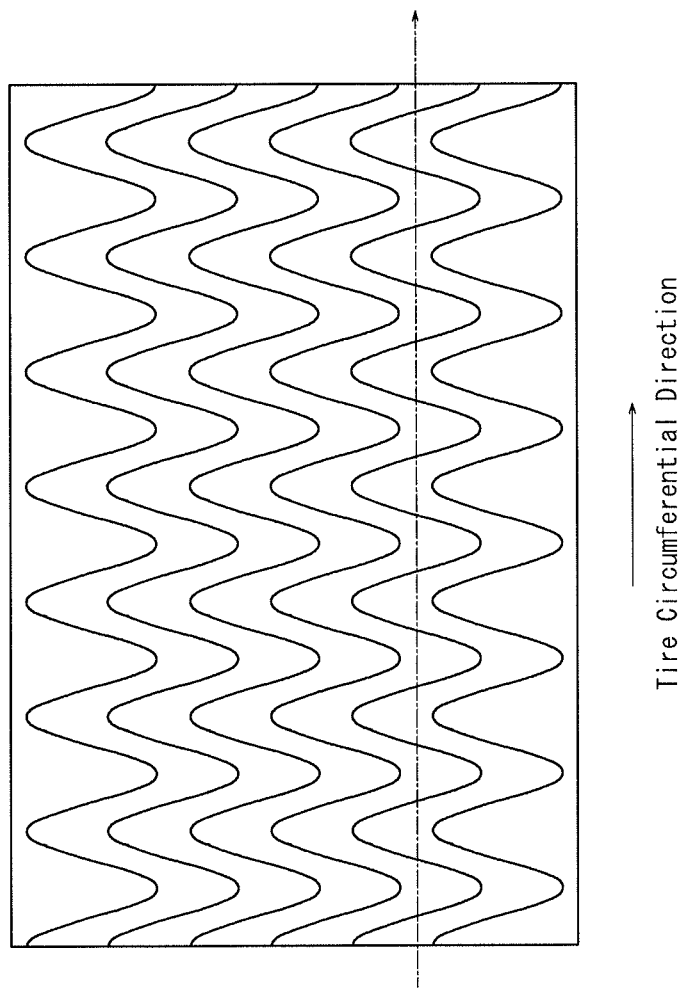
FIG. 5 is a partial developed plan view schematically showing the belt structure of a conventional pneumatic tire.

Subsequently, as shown in FIG. 4(a), cylindrical protective layer material may be formed by, for example, attaching the sheet member 13a cut at the predetermined angle $\alpha$ to the outer peripheral surface of a cylindrical tire structural member 11, such as belt material formed surrounding a cast drum. The sheet member 13a is attached with the cut direction c aligned with the circumferential direction of the tire structural member 11, so that the cut surface of the sheet member 13a faces outwards in the axial direction of the tire structural member 11.

In a tire that is manufactured by vulcanization molding of a raw tire having such protective layer material, the inclination angle $\theta$ of the amplitude center line of each wavy cord in the protective layer relative to the circumferential direction of the tire matches the cut angle $\alpha$.

Here, the waveform of the wavy cords 9 curved in the sinusoidal shape and embedded in the strip-shaped member 12 shown in FIG. 3 can generally be expressed as $y = a \cdot \sin(2\pi/\lambda \cdot x) + y_0$, and the inclination of the tangent can be expressed as $y' = 2\pi a/\lambda \cdot \cos(2\pi/\lambda \cdot x)$. In particular, when $x = \lambda$, the inclination reaches the maximum value of $2\pi a/\lambda$.

Furthermore, the inclination of the cut direction c when cutting the strip-shaped member 12 can be expressed as $\tan \alpha$.

For example, assuming the cut angle $\alpha$ to be between 60° and 80°, if the inclination $\tan \alpha$ of the tangent c and the maximum value $2\pi a/\lambda$ of this inclination satisfy the relationship $\tan \alpha > 2\pi a/\lambda$ ($0° < \alpha < 90°$), then the inclination of the cut direction c becomes larger than the maximum value of the inclination of the tangent to the wavy cords. As a result, when cutting the strip-shaped member 12, each wavy cord intersects the cut direction c at one point and is cut in one location, so that none of the wavy cords 9 aligned in the width direction of the strip-shaped member 12 is segmented within one sheet member 13a when the strip-shaped member 12 is cut.

Therefore, since the relationship $\tan\theta < 2\pi a/\lambda$ is satisfied in the tire of this invention, the wavy cords are not segmented within the protective layer, thus allowing the cords in the protective layer to change shape in accordance with changes in form to the tire and preventing tension from being exerted on the cords.

On the other hand, if the strip-shaped member 12 is cut at a cut angle β that is too small to satisfy the above conditions, for example between 20° and 40°, then in particular in the wide strip-shaped member 12 with a large number of cords, each wavy cord intersects the cut direction d at two or more points and is cut in two or more locations, as shown in FIG. 3. In this case, segmented cords 19a, 19b and 19c exist within one sheet member 13b. Therefore, segmented wavy cords also exist in the protective layer of a tire manufactured using protective layer material formed as shown in FIG. 4(b), resulting in the cords within the protective layer not being able to change in accordance with changes in form to the tire.

EXAMPLES

Next, prototype tires of size 50×20.0R22 32PR were produced to have the structure shown in FIGS. 1 and 2. As shown in Table 1, specifications were changed among Example Tires 1-3 and Comparative Tires 1-3, and the resistance to detachment of the tread portion as well as the size of detached rubber were measured for each tire.

Note that the Comparative Tires required no structural alterations apart from the protective layer and therefore were produced in accordance with the Example Tires.

TABLE 1

|  | Example Tire 1 | Example Tire 2 | Example Tire 3 | Comparative Tire 1 | Comparative Tire 2 | Comparative Tire 3 |
| --- | --- | --- | --- | --- | --- | --- |
| Cord angle θ (deg.) | 40 | 60 | 80 | 0 | 20 | 90 |
| tan θ | 0.84 | 1.73 | 5.67 | 0 | 0.36 | — |
| Wavelength λ (mm) | 31 | 15 | 12 | 28 | 45 | 27 |
| Half amplitude a (mm) | 4 | 4 | 10 | 3 | 2.5 | 4 |
| 2πa/λ | 0.81 | 1.68 | 5.24 | 0.67 | 0.35 | 0.93 |

Resistance to Detachment of Tread Portion

Each of the Example Tires 1-3 and Comparative Tires 1-3 was attached to a size 50×20 OR22 rim and inflated to an internal pressure of 1520 kPa. A cut the width of the center rib was made in each tire from the tread surface to the top of the cords in the protective layer. Test liftoff was then repeatedly performed at 120% tire load, and the number of runs until the tread portion detached was measured to assess the resistance to detachment of the tread. Table 2 shows the results of assessment.

Note that the indices in Table 2 were calculated using the value for Comparative Example Tire 1 as a control. A larger index indicates superior resistance to detachment of the tread portion.

Size of Detached Rubber

For each of the Example Tires 1-3 and Comparative Tires 1-3, the size of the rubber that detached during the test of resistance to detachment of the tread portion was measured. Table 2 lists the results.

Note that the indices in Table 2 were calculated using the value for Comparative Tire 1 as a control. A smaller index indicates a smaller fragment of detached rubber.

TABLE 2

|  | Example Tire 1 | Example Tire 2 | Example Tire 3 | Comparative Tire 1 | Comparative Tire 2 | Comparative Tire 3 |
| --- | --- | --- | --- | --- | --- | --- |
| Resistance to detachment of tread | 100 | 130 | 100 | 100 | 80 | 80 |
| Size of detached tread | 70 | 50 | 40 | 100 | 80 | 30 |

The results in Table 2 show that as compared to the Comparative Tire 1, the Example Tire 1 had equivalent resistance to detachment of the tread portion yet yielded smaller detached rubber. The Example Tire 2 dramatically improved on both the resistance to detachment of the tread portion and the size of the detached rubber as compared to the Comparative Tire 1. The Example Tire 3 had equivalent resistance to detachment of the tread portion yet dramatically improved on the size of the detached rubber as compared to the Comparative Tire 1.

The Comparative Tire 2 had worse resistance to detachment of the tread portion yet yielded a smaller detached tread than the Comparative Tire 1. The Comparative Tire 3 did not achieve the effect of change in the wavy cords whatsoever and thus had worse resistance to detachment of the tread portion than the Comparative Tire 1.

REFERENCE SIGNS LIST

1: Tread portion
2: Sidewall
3: Bead portion
4: Bead core
5: Carcass plies
5a: Turn-up ply
5b: Down ply
6: Belt
7: Protective layer
8: Tread rubber
9: Wavy cord
11: Tire structural member
12: Strip-shaped member

13a, 13b: Sheet member
19a, 19b, 19c: Segmented cord
c, d: Cut direction
α, β: Cut angle
θ: Inclination angle

The invention claimed is:

1. A pneumatic radial tire for aircraft comprising a radial carcass constituting a backbone structure of the tire, a belt disposed along an outer periphery of a crown region of the radial carcass, and at least one protective layer disposed along an outer periphery of the belt and formed by a plurality of cords, wherein:

the cords in the protective layer are curved in a sinusoidal shape and disposed in parallel with equal phase; and an acute inclination angle θ of an amplitude center line of each cord relative to a tire circumferential direction, a half amplitude a of each cord, and a wavelength λ of each cord satisfy the relationship:

$\tan \theta > 2\pi a/\lambda > 0.4$ ($0° < \theta < 90°$), and wherein $0.81 \geq 2\pi a/\lambda > 0.4$.

2. The pneumatic radial tire for aircraft of claim 1, wherein cords of the belt are formed of nylon.

* * * * *